(12) United States Patent
Balon, Jr. et al.

(10) Patent No.: US 10,221,371 B2
(45) Date of Patent: Mar. 5, 2019

(54) TORREFACTION/GASSIFICATION SYSTEM

(71) Applicant: Clean Electricity Generation UK LTD, Leicester (GB)

(72) Inventors: Thomas Balon, Jr., Pembroke, NH (US); Neil Butler, London (GB)

(73) Assignee: CEG TECHNOLOGY UK LIMITED, Leicester (GB)

( * ) Notice: Subject to any disclaimer, the term of this patent is extended or adjusted under 35 U.S.C. 154(b) by 62 days.

(21) Appl. No.: 15/421,943

(22) Filed: Feb. 1, 2017

(65) Prior Publication Data
US 2017/0145332 A1 May 25, 2017

Related U.S. Application Data

(62) Division of application No. 13/998,761, filed on Dec. 3, 2013, now Pat. No. 9,631,156.

(51) Int. Cl.
*C10L 5/44* (2006.01)
*C10L 9/08* (2006.01)

(52) U.S. Cl.
CPC .............. *C10L 5/447* (2013.01); *C10L 9/083* (2013.01); *C10L 2290/06* (2013.01); *C10L 2290/08* (2013.01); *Y02E 50/10* (2013.01); *Y02E 50/15* (2013.01); *Y02E 50/30* (2013.01); *Y10T 29/49716* (2015.01)

(58) Field of Classification Search
CPC .. C10L 2290/66; C10L 2290/08; C10L 5/447; C10L 9/083; C10L 2290/06; Y10T 29/49716; Y02E 50/10; Y02E 50/15; Y02E 50/30
See application file for complete search history.

(56) References Cited

U.S. PATENT DOCUMENTS

| | | | |
|---|---|---|---|
| 6,145,652 | A | 11/2000 | Durnil |
| 2008/0263890 | A1 | 10/2008 | Picard |
| 2009/0126219 | A1* | 5/2009 | Mathis, Jr. ............ F26B 17/106 34/446 |
| 2009/0183430 | A1* | 7/2009 | Schubert .................... C10J 3/04 48/85 |
| 2010/0146814 | A1 | 6/2010 | Baker et al. |
| 2013/0137053 | A1 | 5/2013 | Prud'homme |

FOREIGN PATENT DOCUMENTS

| | | |
|---|---|---|
| DE | 102010045612 A1 | 3/2012 |
| RU | 2377489 C1 * | 12/2009 |
| WO | 2013151571 A1 | 10/2013 |

* cited by examiner

*Primary Examiner* — Latosha Hines
(74) *Attorney, Agent, or Firm* — Hayes Soloway PC (57) ABSTRACT

A modified dryer operates on a different principle from that used by the prior torrefaction plants. The subject invention utilizes thermal conduction to torrefy the biomass in a vibratory reactor in which a heated solid unperforated plate is sealed in the reactor to separate the biomass above from the gas used to heat the plate below. This permits using inert flue gas to heat the reactor which in turn permits the use of a cool air damping system to prevent thermal runaway. Also syngas evolved from the process is utilized to power a gas engine, the exhaust output of which is recirculated to heat the reactor plate. When the gas engine is coupled to an electric generator, waste energy is recovered for use in other parts of the plant or exported elsewhere.

16 Claims, 8 Drawing Sheets

TORREFACTION/GASSIFICATION SYSTEM

CROSS REFERENCE TO RELATED APPLICATION

This application is a divisional of U.S. patent application Ser. No. 13/998,761, filed on Dec. 3, 2013, the entire disclosure of which are incorporated herein by reference.

FIELD OF THE INVENTION

This invention relates to torrefaction systems and more particularly to an environmentally safe fire and explosion resistant system in which a standard commercial vibratory dryer is modified to provide a reactor.

BACKGROUND OF THE INVENTION

Torrefaction, or the roasting of a biomass such as wood chips and the like, has been used in the past to produce biocoal, which is packaged as a briquette or pellet that can be utilized to replace fossil fuel. The biocoal is characterized by high energy density, homogeneity, is hydrophobic, exhibits no biologic activity and offers improved grindability, making the torrefied product not only coming from a sustainable source such as renewable wood supplies but also is environmentally sound, oftentimes when directly replacing natural coal eliminating $CO_2$ emissions.

In replacing fossil fuels biocoal may be used as a wood power fuel, in steel production, in centralized heating and as a clean stock for production of transportation fuels such as methanol.

As exemplified by the present plant at Stamproy Green, biocoal is produced utilizing a standard commercial dryer that has been modified into a torrefaction reactor. It is noted that the original Carrier dryer was designed to recirculate air for a number of drying applications in order to remove moisture from product. The modification of the Stamproy Green reactor involves modifying the dryer with a perforated plate onto which biomass in the form of wood chips are deposited at one end, and through which hot synthetic wood gas or syngas is passed to roast or torrefy the wood in a convective heating operation. The reactor, fed by an inlet airlock device such as a screw, is vibrated causing the roasted or torrefied wood chips to move down the perforated plate to the exit port where the torrefied material is collected by an outlet airlock device such as a screw. In this manner the reactor remains air tight and the torrefied biomass while roasting produces syngas which is subsequently recirculated through the dryer.

It is noted that in this prior modification of the Carrier dryer there are no moving parts within the reactor and there were very few changes needed to the dryer itself, other than external air locks, to make it suitable for use as a convective torrefaction reactor. The changes in the commercial Carrier dryer to accommodate torrefaction include modifying the above-mentioned perforated plate and to provide an external burner to combust a small amount of excess evolving syngas and an external heat exchanger to then heat the larger volume of recirculated syngas so it can be injected into the bottom of the reactor. The external piping of hot syngas poses a severe fire hazard, especially outside the reactor. Because the reactor is vibratory and the piping in the facility is fixed, numerous flexible connections are used and each poses a safety concern.

It is noted that syngas is extremely flammable and in the presence of oxygen rapidly combusts or could potentially explode. The hotter the syngas the higher the likelihood of explosion. Because the existing oxidizer burner output is at about 800 degrees C., an extremely hazardous situation exists outside the reactor due to the superheated flue gas from this burner. This superheated fluegas is heat exchanged with recirculated syngas from the reactor to ideally produce injected recirculated syngas at 300-400 degrees C., but as high as 500° C., requiring a special heat exchanger that can cope with high differential temperatures of 800° C. on one side and 300° C. on the other side. The control of the energy balance between the two sources is problematic and non linear in nature. This heat exchanger also poses a safety risk and is located outside of the reactor.

It is noted that torrefaction ideally takes place at between 250° C. and 300° C., and is to take place in an oxygen-free environment. Aside from the situation of potential leaks outside the reactor, if there is oxygen leakage into the reactor, the syngas that normally evolves during the torrefaction process can explode causing rupture of the reactor or at the very least a significant thermal runaway event that would damage the equipment. When operating at 300° C. the evolving syngas creates a massive safety risk, with any leak involving flammable hot gas looking for oxygen. Also leakage can cause the release of deadly carbon monoxide. Add to this the risks associated with external burners and 500° C. heated syngas ported to the bottom of the reactor through ductwork, present torrefaction installations are exceedingly dangerous.

The leakage danger in vibrating torrefaction reactors is due to the inherent vibration conveying design that loosens the couplings or deforms the coupling material itself between the reaction chamber which is vibrating and the conduits or duct work which are fixed to pipe the syngas which is evolved in the torrefaction process. The present modified Carrier dryers have as many as 15 ducting conduits coupled to the sides of the reactor. At each of these large pipes or conduits is a gland which is a flexible coupling to be able to absorb the vibration of the reactor, with the flexible joints between the fixed conduits and the vibrating reactor designed to prevent the leakage of oxygen into the reactor and to prevent outflow of gases developed in the reactor. However it has been found that there are frequent failures of these glands making such torrefaction systems unsafe as air/syngas leaks are not only difficult to prevent, but also difficult to detect in this process environment.

The Stamproy Green modification of the standard Carrier dryer for torrefaction thus results in numerous ports of entry for oxygen due to the failure of glands around the conduits utilized to duct the waste products from the torrefaction process either to outside the plant or to be used in a heat recapture process to recycle heated gas to the bottom of the reaction chamber.

As will be appreciated it is important to provide a reaction chamber in which oxygen cannot inadvertently leak in and cause fires or explosions. It has been the experience of torrefaction plants in the past that fire is the major cause of failure of the plant and there is therefore an urgent requirement that such reactors be constructed in a different manner to minimize the possibility of the influx of oxygen that can cause explosion or the venting of dangerous gas components or the exhaust of dangerous gases at these glands. Also there is a requirement to increase the efficiency of the system to be able to better utilize the energy associated with evolved syngas to provide a source of electricity to run the process and to capture useful waste heat.

In addition to the leakage problem noted above, an even further problem with the Stamproy Green plant is thermal runaway. Thermal runaway occurs when reactor temperatures cannot be controlled. This is the result of the inability to sufficiently remove energy from the evolving process. Currently aside from slowing down the biomass feed stock supply which can take as long as 30 minutes to be effective, to kill thermal runaway the entire plant has to be shut down. In terms of production this is unacceptable. Thus there is an urgent need to be able to control thermal runaway by including a process element to remove energy from the system.

More particularly, and as mentioned above, in the Stamproy Green plant syngas which is the evolved product in torrefaction, is coupled to a burner which heats the 300° C. syngas by the burning some of the syngas to create 800° C. fluegas. Additionally, syngas which is not coupled to the burner is collected by utilizing a blower and it is directed into a heat exchanger in which the 300° C. syngas is heated by the 800° C. fluegas output of the burner to provide as high as a 500° C. syngas that is injected into the bottom of the reactor. Thereafter and through convective heating the hot gas passes through the aforementioned perforated plate and into the overlying biomass in the form of wood chips at which point the wood chips are torrefied or roasted.

As stated above, this process includes a large number of inlet and exhaust conduits, which can number as many as 15, each having its own flexible gland at which air and therefore oxygen can enter into the reactor upon gland rupture.

This process is indeed dangerous due to the many conduits associated with the reactor as well as for instance the highly heated burner output which is ducted to the reactor. It will be appreciated that that which is injected into the reactor is not inert gas but rather a highly volatile heated syngas which if mixed with oxygen can result in explosions, fire or thermal runaway.

SUMMARY OF INVENTION

In order to make the torrefaction process less dangerous, rather than using all of the 15 available ventilation ports on the dryer, all but three of these ports are sealed off, one for syngas and two for flue gas, to significantly limit potential syngas leakage due to gland rupture from the vibrating reactor. In one embodiment, the number of conduits associated with the carrier reactor are limited to a single syngas bleed to power a gas engine and an inlet conduit to take the engine exhaust from the gas engine and inject it into the bottom of the reactor below an unperforated solid waffle plate that divides the reactor into an upper and lower compartment or plenum along with a second outlet conduit for the flue gas.

This solid plate is heated with non-volatile exhaust gas from the engine such that the only volatile and flammable gas in the reactor exists in the upper plenum or chamber in the form of syngas. The heated plate conductively transfers heat to the top chamber and biomass as opposed to using convective heating which in the past has involved the whole reactor chamber, ducts, blower, heat exchanger, all full of flammable gas. Here because of the sealing of the solid plate into the reactor to provide the two plenums or chambers, only inert gas from the exhaust of the gas engine is injected into the reactor.

Note, there is only one syngas conduit with significantly less ducting, thereby decreasing by orders of magnitude the danger of explosions and fires. Thus, in one embodiment 8 of the original output ports from the Carrier dryer are simply blocked off, thereby minimizing the number of leakage points in the modified reactor to only one, that being the syngas port to the gas generator.

Secondly, rather than drawing off and mixing syngas with combustion air to a burner fueled by the syngas, in one embodiment an internal combustion gas engine is fueled by the evolving syngas, with the non-volatile exhaust gas of the engine injected into the bottom chamber of the reactor. This non-volatile exhaust gas includes nitrogen, $CO_2$ and a small amount of oxygen and arrives beneath the solid plate at about 500° C. As a result an external burner with its associated 800° C. flue gas exhaust and its associated external heat exchanger, the cause of dangerous operation, is completely eliminated.

The use of non-volatile exhaust gas from the gas engine also opens up the opportunity to control reactor temperature by injecting cold air into the exhaust gas for dilution and cooling of the reactor. Such could not be done with the recirculated hot syngas used in the Stamproy Green plant. In one embodiment, thermal runaway is prevented by the injection of cold air into the inert exhaust gas stream from the gas engine to cool the non-volatile exhaust gas that fuels the reactor. Cold air introduction is controlled by a damper that is in turn controlled by the temperatures sensed at the exhaust gas input to the reactor and syngas outlet of the reactor, the pressure of the syngas utilized to fuel the gas engine and the current generated by an electrical generator driven by the gas engine. As a result, cold air damping provides an even flue gas temperature at the underside of the unperforated plate within the reactor, with fires and explosions further minimized by the utilization of a cool air damper. Moreover, and thermal runaway can be prevented immediately.

Because the evolving syngas is utilized to fuel a gas engine, in one embodiment the gas engine is used to drive the above-mentioned electric generator for energy recovery. It is noted that the utilization of the syngas-powered gas engine with an electric generator recovers otherwise potentially wasted energy from the process which may be utilized elsewhere in the plant, while at the same time providing a current sensor, indicative of load, for the control of the process. While temperature and pressure are useful control parameters, generator current coupled with voltage gives an indication of the energy (kWh) removed from the reactor, which is very useful for process control.

Further, the sealing of the top chamber or plenum of the reactor from the bottom chamber or plenum using a solid plate isolates the potentially dangerous syngas to only the top chamber of the reactor where leakage can be more readily controlled. Furthermore, having only clean inert flue gas in the bottom chamber of the reactor allows for thermal insulation to be placed inside the reactor in addition to or in lieu of external insulation. Internal insulation, akin to that used in a thermal oxidizer, allows for higher 500° C. flue gas temperatures without adversely affecting the structural integrity of the steel reactor.

In summary the modified dryer operates on a different principle from that used by the prior torrefaction plants. The subject invention utilizes thermal conduction to torrefy the biomass in a vibratory reactor in which a heated solid unperforated plate is sealed in the reactor to separate the biomass above from the gas used to heat the plate below. This permits using inert flue gas to heat the reactor which in turn permits the use of a cool air damping system to prevent thermal runaway. Also syngas evolved from the process is utilized to power a gas engine, the exhaust output of which is recirculated to heat the reactor plate. When the gas engine is coupled to an electric generator, waste energy is recovered for use in other parts of the plant or exported elsewhere.

BRIEF DESCRIPTION OF THE DRAWINGS

These and other features of the subject invention will be better understood in connection with the Detailed Description, in conjunction with the Drawings, of which.

DETAILED DESCRIPTION

Prior Art

Figure 1:
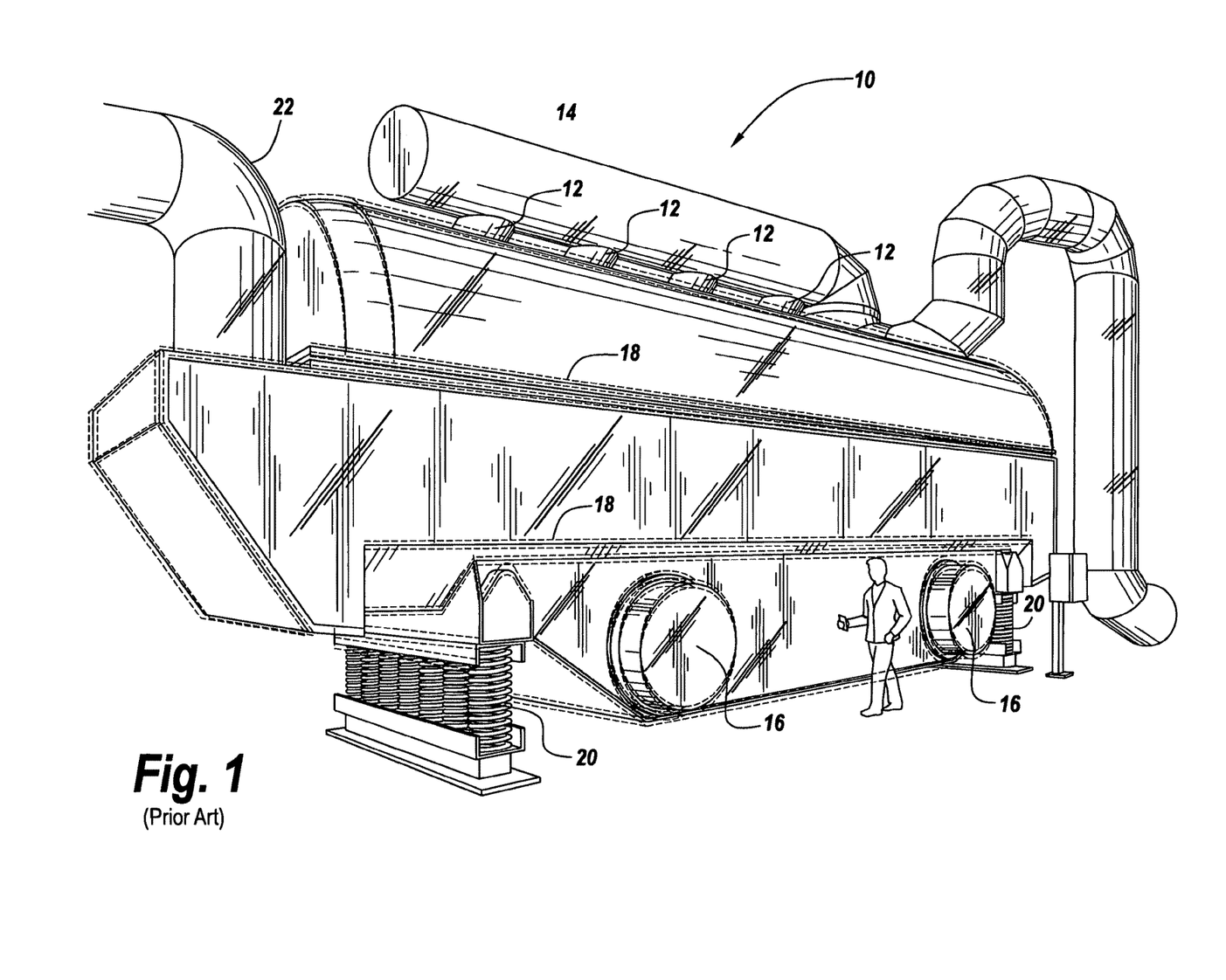
FIG. 1 is a diagrammatic illustration of a typical prior art vibratory dryer which has been modified for torrefaction showing the vibration of the reactor.

Referring now to FIG. 1, a reactor 10 in the form of a modified Carrier vibratory dryer includes syngas ducting conduits 12 which are coupled to a manifold 14 for capturing the syngas generated by the reactor. As illustrated, off center weights in modules 16 cause the entire reactor to vibrate as illustrated by the dotted lines 18, with reactor mounted on springs 20 to permit the vibrating. Here the biomass is introduced at duct work 22 so that it travels down the interior of the reactor to produce biocoal.

Figure 2:
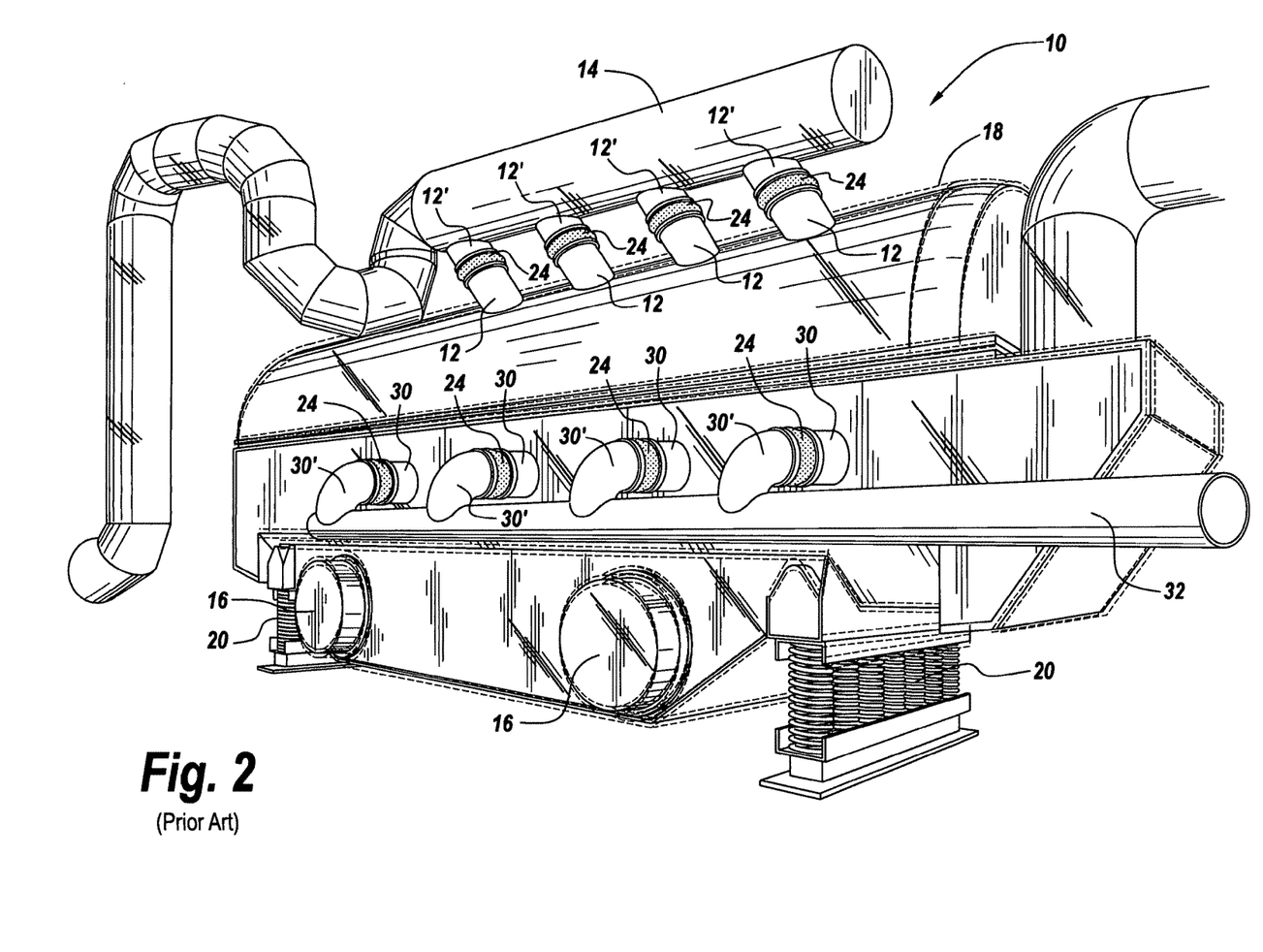
FIG. 2 is a diagrammatic illustration of the reactor of FIG. 1 showing the number of the conduits used in the prior art dryer which are attached to the reactor through flexible couplings in which the flexible couplings may rupture during torrefaction.

Referring to FIG. 2, the other side of reactor 10 is shown in which duct work 12 is shown coupled to the aforementioned manifold 14, with the joints between the duct work and the portions of the conduit 12' joined through the utilization of a gland 24 which permits movement between conduits 12 and 12' with the motion 18 of reactor 10 and manifold 14. Also shown are inlet conduits 30 which have glands 24 interposed between conduits 30 and the exterior portions 30', with the input to the reactor being supplied by a manifold 32 into which hot gas is to be introduced.

Here it can be seen that the vibration of reactor 10 is accommodated through glands or flexible joints 24 which, inter alia, must be capable of porting the hot syngas at 300° C. out of the reactor and be able to port heated syngas into the bottom of the reactor.

It is noted that the vibratory dryer is modified in this prior art installation in which the commercial dryer is used to migrate material through the dryer with no moving parts. In essence for this prior art installation there were very few changes necessary to convert the vibratory dryer to a torrefaction reactor. The first physical change made is that a modified perforated plate is used within the dryer to support the biomass which incorporates wood chips that for instance tend to turn to dust. The dust as it will be appreciated will fall through the holes in the perforated plate as originally supplied.

Figure 3:
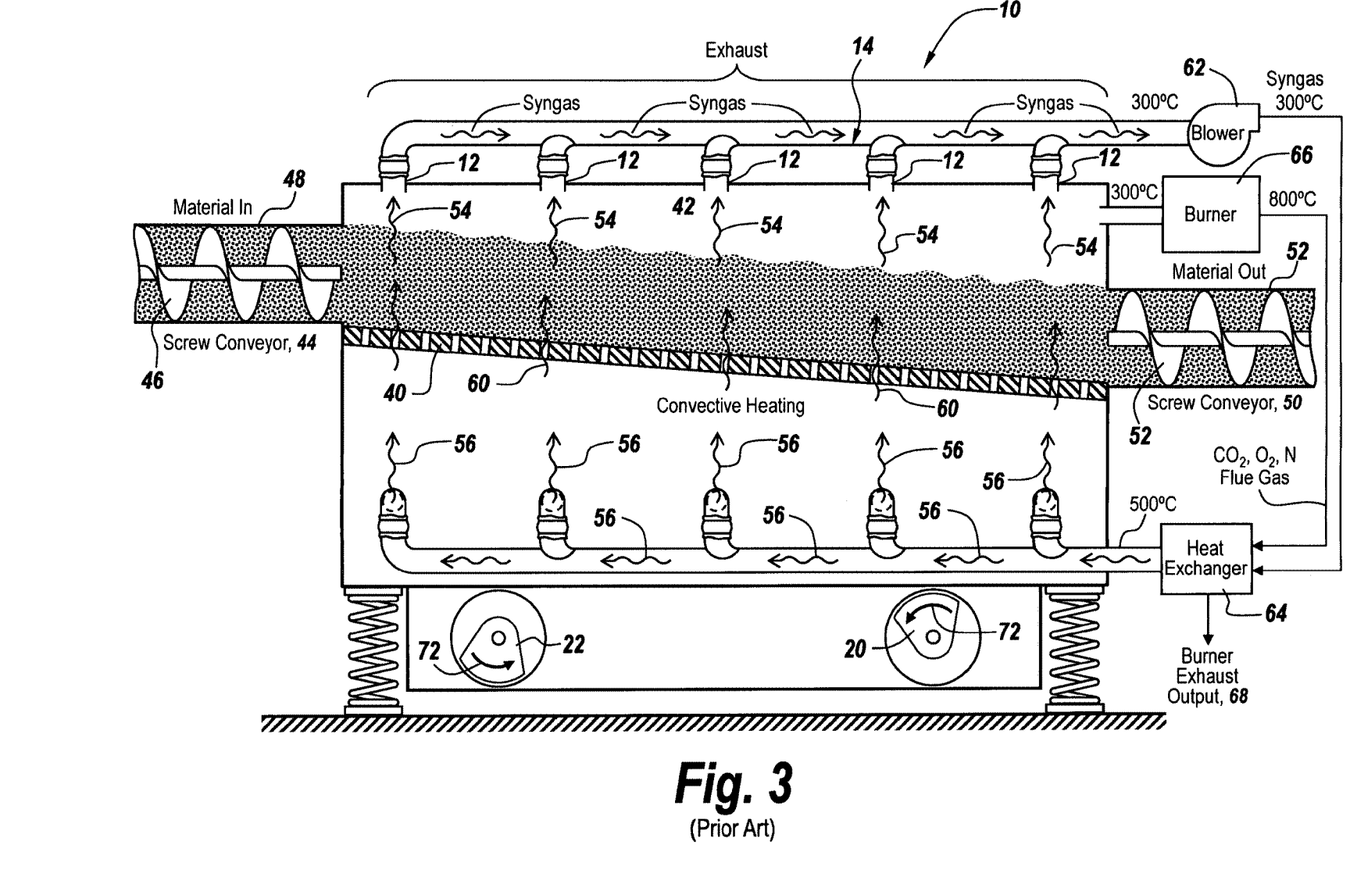
FIG. 3 is a diagrammatic illustration of a prior art torrefaction system utilizing a vibrating dryer in which the biomass is extruded onto a perforated plate and in which hot gas passes up through the plate in a convective heating process whereupon synthetic gas or syngas is evolved and is mixed with the output of a burner in a heat exchanger to provide heated gas for the torrefaction process.

How this prior art reactor works is shown in FIG. 3 in which reactor 10 is provided with a perforated plate 40 that heats the wood chip biomass 42 that has been injected into the reactor through a screw conveyor 44, with the biomass completely filling the void between the screw conveyer impellers 46 and the exterior conduit 48 of the conveyer. It will be appreciated that this screw conveyer does not allow ingress of oxygen into reactor 10, with the reactor being sealed by the biomass itself. At the distal end of the perforated plate is a cooling screw conveyer 50 also having a screw 52 in which biomass 42 completely fills the space between the screw conveyor and its outer conduit 54, again sealing the reactor against the influx of oxygen. As will be discussed if the reactor is unsealed there is a possibility for fire or explosion of the syngas 54 which evolves from biomass 42 during the torrefaction process.

The torrefaction process starts with providing heated gas 56 beneath perforated plate 40 such that it passes through orifices 58 in plate 40 and then passes as illustrated at 60 through the wood chip biomass to roast or torrefy the wood chips such that what exits screw conveyor 50 in one embodiment is biocoal or briquettes due to the roasting or torrefaction process. The efficiency of the torrefaction process is defined by the energy output from the process in the form of biocoal divided by the energy input to the process in the form of biomass, typically wood. The net energy lost in the process is in the form of syngas evolved which functionally is lost from the process as radiated or exhausted heat.

In order to capture and utilize waste heat from the process, syngas 54 is piped through the aforementioned conduits 12 and manifold 14 to a blower 62 such that the evolving 300° C. syngas is forced out of the blower and into a heat exchanger 64. The ideal heat for the convective heating shown in FIG. 3 is on the order of 400° C. to 500° C., with torrefaction resulting in 300° C. syngas. Heat exchanger 64 is fed by an 800° C. burner 66 output which transfers thermal energy to the 300° C. syngas to provide the heated syngas 56 in manifold 32. It is noted that in one embodiment in the heat exchanger is provided with cylindrical tubing which transfers the heat from the burner output to the syngas, with the burner exhaust output being as illustrated at 68.

Here it can be seen that off center weights 70 rotating as illustrated by arrows 72 cause reactor 10 to vibrate so as to move the biomass from screw conveyor 44 to screw conveyor 50.

Figure 4:
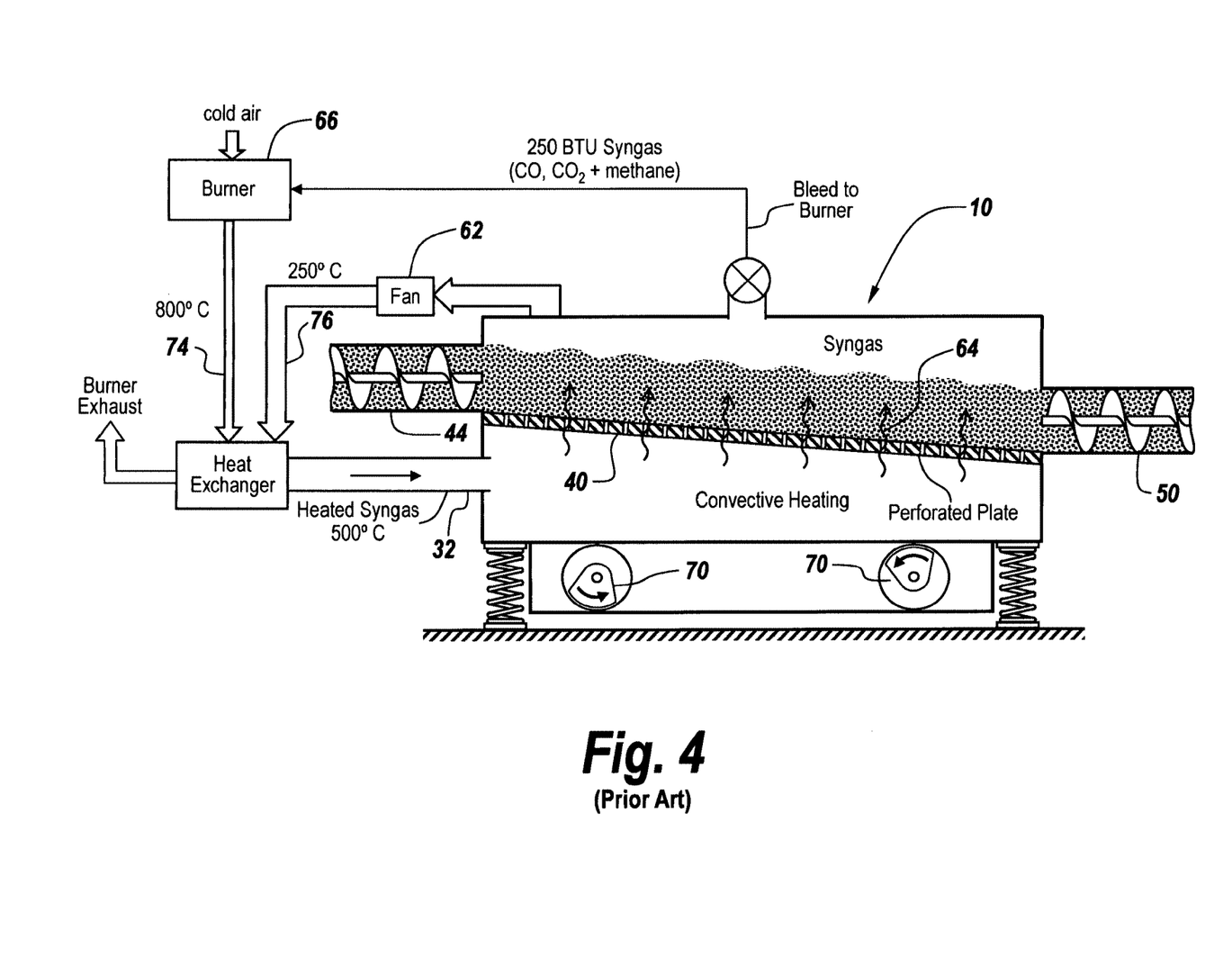
FIG. 4 is a diagrammatic illustration of the operation of the prior art torrefaction system of FIG. 3 illustrating both convective heating, a perforated plate, the utilization of syngas bled off in the process which is utilized to fuel a burner that in turn is coupled to a heat exchanger to heat the syngas from the reactor for providing heated syngas to the bottom of the perforated plate.

Referring now to FIG. 4, schematically syngas 54 is bled out of reactor 10 to burner 66 whereupon an 800° C. burner output as illustrated at 74 is mixed with a high volume syngas output at conduit 76 provided by blower fan 62.

Here it can be seen through the thickness of arrows 74 and 76 that the flow rate from the burner is significantly less than the massive flow rate output of 62 which may be for instance as low as 250° C. As illustrated at manifold 32 a heated low volume syngas output at 500° C. is mixed with the high volume output from fan 62 such that the temperature of the syngas from the blower is heat augmented using the output of burner 66.

As mentioned above, the physical change to the commercial carrier vibratory dryer includes the utilization of a modified perforated plate in which the apertures in the plate are sized to minimize the amount of dust that can fall through the holes when hot gases are moving upwardly through the apertures in the plate. In one embodiment, not shown, small covers are placed over the holes such that the dust is not allowed to fall back down through the holes.

The second change for the commercial vibratory dryer is that the dryer is no longer drying materials, i.e. removing moisture, other than wood but is now heated to a temperature which will roast the wood chips and is much like putting wood into a frying pan, with the wood giving off flammable gases such as methane, hydrogen, acetic acid and carbon monoxide.

The end result is that instead of using a unit which circulates air in a drying process, in a torrefaction application what is actually generated is recirculated syngas. It will be appreciated that synthetic gas or syngas is a low BTU gas that can be generated for instance from landfill gas and more particularly from wood or from coal. Syngas is used instead of methane which has a heat value of 1,000 BTU per cubic foot because of its ready availability and low cost. Specifically the range for syngas is on the order of 200 to 400 BTU such that what is utilized in the torrefaction process is a low BTU synthetic gas.

Safety a) Reducing Number of Conduits

In the above prior art torrefaction process there is a considerable safety concern because syngas has replaced air in the dryer and the temperature of the dryer in the torrefaction process is on the order of 300° C. as opposed to for instance 60° C. for commercial drying. At these higher temperatures with syngas one creates a massive safety risk such that any leak is going to involve a flammable hot gas that is looking for oxygen.

It is noted that the prior art reactor is intended to be a closed system in which the leakage of oxygen into the reactor is specifically to be avoided. In practice upon starting up of the system a small amount of oxygen is consumed in regular combustion. For the first 10 to 15 minutes the wood that is on top of the perforated plate is actually combusting. Once all of the oxygen is consumed one is creating more and more syngas and this is done in an oxygen-free environment thereafter recirculation of the syngas is ultimately used to produce heat to drive the process.

In the prior art reactors of FIGS. 1 and 2 there is perhaps 200 to 300 feet of external duct work which is fixed but must be connected to the violently vibrating reactor. As pointed out above there are physical connections between the pipe work which isn't vibrating and the unit which is vibrating. Because of the vibration the aforementioned glands have ruptured and many leaks and fires have been caused at the facility in which the Carrier dryers have been modified with conventional flexible connections.

Originally the flexible connections were made out of fabric but the fabric could not handle the temperatures and would eventually rupture and result in leaks. Thereafter the glands were made in the form of a convoluted stainless steel expansion bellows system which partially mitigated the problem and were able to handle the high temperatures. However, the vibration in and of itself loosened these glands and with as many as 15 of these metal connections if any one of them leaks it puts syngas into the facility and is an ever present risk. Also because syngas is predominantly carbon monoxide, health and safety of the employees in such a plant are also a significant risk.

Thus, the plugging of most of the holes for the prior art conduits significantly reduces the possibility of fire or explosion due to the fact that only one syngas joint or flange need be addressed for maintenance purposes. Note also that whatever syngas is utilized exists only within the reactor and that the utilization of an external recirculating blower and external heat exchanger is eliminated, thereby eliminating the flammable syngas recirculation loop of the prior art system shown in FIGS. 3 and 4.

Significant modifications to the standard vibratory dryer first and foremost include closing all but one of the ducts that are used to recirculate the syngas. This can be seen in FIG. 5 in which a single pipe or conduit 80 is utilized to bleed the evolving syngas 54 to a cooler 82 to remove tar as illustrated at arrow 84, with the output 86 of the cooler coupled to a gas engine 88 to which is attached an electrical generator in one embodiment. As will be seen, the output of the gas engine 90 is non-volatile and substantially inert, although some oxygen remains. This gas engine output exits at approximately 500° C. which is then injected through conduit 92 as illustrated by arrow 94 into the bottom portion of reactor 10.

b) Conductive Heating and the Use of a Solid Torrefaction Plate

Figure 5:
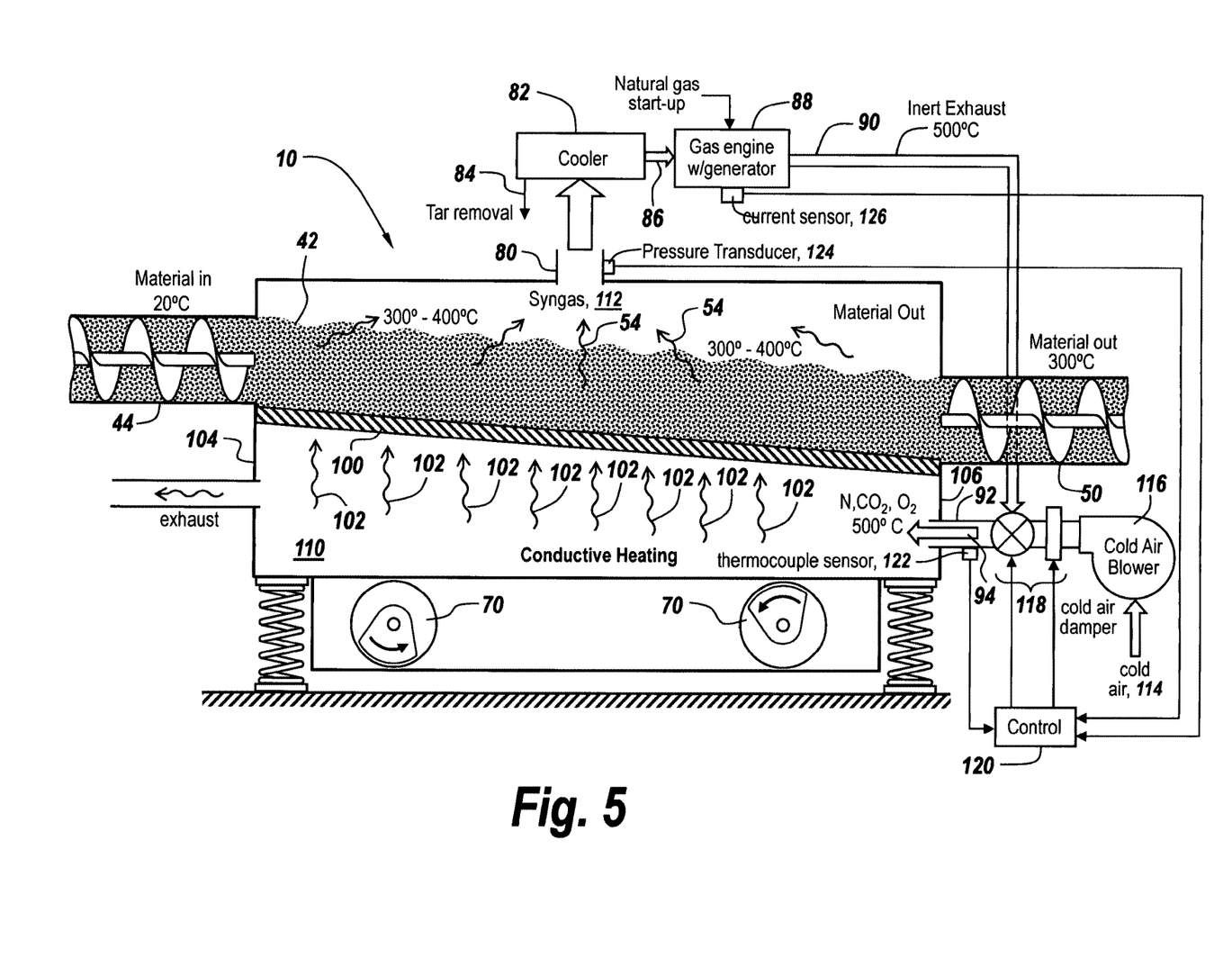
FIG. 5 is a diagrammatic illustration of one embodiment of the subject invention in which the standard vibrating dryer is converted to a conductive heating process through the use of a solid inclined plate which is heated from below with the output from a gas engine fueled by the syngas that is evolving from the torrefaction process, also illustrating the injection of cold air through a damper to prevent thermal runaway.

It will be seen that rather than using convective heating, in the subject application a solid plate 100 is utilized to support biomass 42 which comes in from screw conveyer 44 and exits from that screw conveyer 50. Here the hot inert gas is illustrated at 102 to impinge upon the lower surface of plate 100 where it heats the plate to 500° C. It will be appreciated that biomass 42 is roasted in very much the same way as using a frying pan in which the biomass is cooked on top of plate 100. Note that convective elements within the top portion of the reactor itself facilitate internal convention much like a convection oven but without the need to remove or recirculate the syngas from the reactor.

What will also be appreciated is that plate 100 is sealed to the ends 104 and 106 of chamber 10, thereby to divide chamber 10 into a lower chamber or plenum 110 and an upper chamber or plenum 112. The result is that while inert gas from gas engine 88 is utilized to heat plate 100, the only portion of the reactor at which flammable gas exists is above plate 100 and with the utilization of only one conduit 80 the leakage associated with the vibration is minimized.

It is noted that the feedstock, namely the wood chips input, exist at approximately 20° C., whereas the torrefied material exits at a relatively hot 300° C. due to the torrefaction that takes place above plate 100. This material is subsequently cooled back to 20° C. by the outlet screw to stop the torrefaction process.

c) Thermal Runaway

As will be discussed more completely hereinafter, thermal runaway is controlled by the ingress of cold air 114 using a cold air blower 116 and a damper and valve assembly 118 such that the non-volatile exhaust gas from engine 88 may be cooled through the ingestion of cold air from outside. It is noted that since only the upper chamber contains flammable gas and since the exhaust output from the gas engine includes nitrogen, $CO_2$ and $O_2$, the control of the heat applied to plate 100 can be rapidly controlled through this cold air damper system.

As will be discussed, a control unit or module 120 controls damper assembly 118 through the output of a thermal couple sensor 122 at conduit 92, a pressure transducer 124 which measures the pressure in conduit 80, and a current sensor 126 which senses the energy removed from the reactor by the gas engine in terms of the current and the kilowatt-hours generated. It will be seen that a balancing of the temperature, pressure and electric current output can effectively modulate the temperature of the incoming gas at 94 so as to stabilize the temperature of the gas applied to the bottom of plate 100.

System Details

Figure 6:
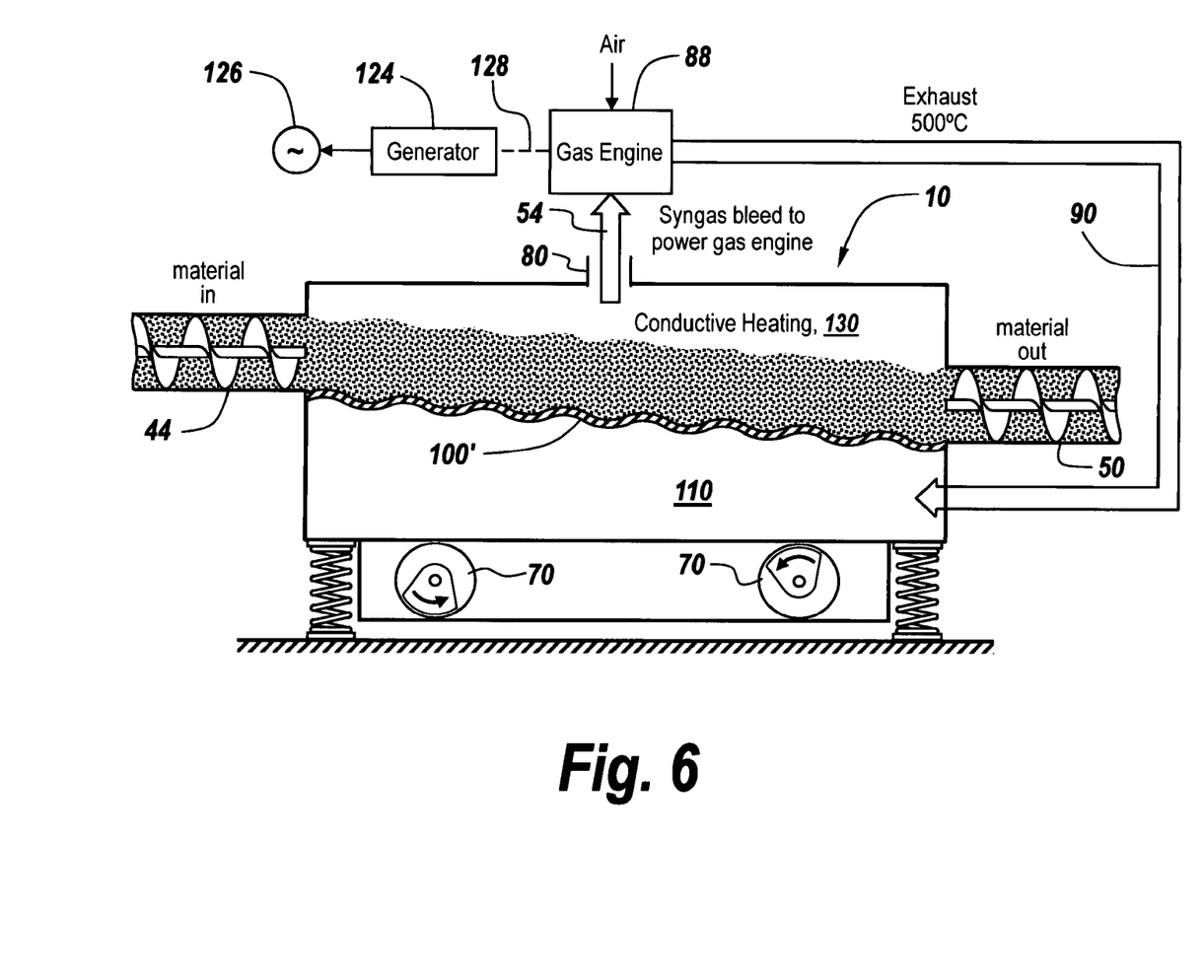
FIG. 6 is a diagrammatic illustration of a portion of the reactor shown in FIG. 5 to illustrate the utilization of a solid plate that seals the reactor chamber into a bottom plenum and a top plenum, with reactor heat provided by the exhaust from a gas engine.

It will be appreciated that all of the syngas evolving from the subject process is leaving the reactor through a single pipe as shown in FIG. 6 by the schematic of plant operation. Here all of the evolving syngas 54 leaves through pipe 80 and is applied to fuel a reciprocating spark ignition gas engine 88 which in this case has a generator 124 mechanically coupled to the gas engine to provide electric current as illustrated at 126. As seen, the use of plate 100 involves conductive heating as illustrated at 130 as opposed to convective heating in the prior installations. Moreover, plate 100 may be a waffle plate 100' to offer more surface area to transfer energy from plenum or chamber 110 to the biomass on plate 100'. Thus it can be seen that the subject reactor operates on conductive heating with a solid plate bifurcating the reactor and in which inert gas from a gas engine is utilized to fuel the reactor.

While a gas engine has been described other types of syngas fired heating units may be utilized such as a gas turbine, burner or a boiler. However because a gas engine also provides a rotary output to drive an electric generator as illustrated by dotted line 128 the electrical energy generated may be used by the plant to power the vibrating motors and other plant equipment as well as sell the unused electricity to the grid.

Referring back to FIG. 5 it will be appreciated that cooler 82 cools the syngas down to room temperature to be able to remove tars that drop out. What then happens is that the syngas is then ducted to a combustion source; gas turbine, burner, boiler or a gas engine, with the gas engine preferred since it may be used to generate electricity efficiently. It is noted that the cooler is utilized to condense the tars out so as not to foul or coke up the gas engine pistons. Tars are very much like creosote and if they can be separated out from the system their recovery provides for another reactor product. The tars can also be utilized as a binder to glue the torrefied powder together into biocoal briquettes or pellets.

It is noted that the hot flue gas from the gas engine is ducted to the bottom plenum 110 with one pipe and while there is some oxygen left over in the combustion flue gas from the gas engine, the output from the gas engine is predominantly nitrogen and carbon dioxide which is non-volatile and basically inert. This inert gas is completely safe as far as employees are concerned and as the utilization of this inert flue gas limits the possibility of explosion. It will be appreciated that the output gas from the engine is around 500° C., whereas the syngas is around 300 to 400° C. It is this differential temperature that is utilized in the drive heat transfer. If there is insufficient heat transfer from the plate to the biomass one can actually introduce a fan into the upper plenum or chamber to stir up the evolving syngas very much like a convection oven to help with transfer. However in most instances this is not necessary.

In summary, the subject system utilizes conduction to transfer heat from the exhaust gas in the lower plenum to the upper plenum and then into the biomass itself. It is noted that gas engines are utilized because they can run on low energy fuels such as syngas at high efficiency as well as across a wide variety of load. These gas engines are readily available especially from engine manufacturers supplying landfill companies and are particularly appropriate for use in the subject system because the exit temperature of the gas is exactly that which is necessary to heat the reactor. The gas engine is also very efficient in producing electricity making it a good additional profit center.

Thermal Efficiency

It is noted that prior torrefaction plants have exhibited an average 50-60% thermal efficiency in part because the amount of evolved syngas cannot be adequately controlled and the excess heat generated is lost. Those that use boilers to extract heat to make steam might have a 66-67% thermal efficiency. However using a syngas fueled gas engine and electrical generator raises the overall thermal efficiency to as high as 80%.

In operation one does not initially have syngas. To start up the reactor one first starts up the engine utilizing natural gas to fire and idle the gas engine. Very little natural gas is utilized to initially power the gas engine and in point of fact the gas engine only idles when starting on natural gas. Once heated the reactor is actively made inert with steam and inert nitrogen so that no combustion happens in the reactor. Biomass is introduced slowly at first until syngas is evolved. Then the engine power increases allowing for biomass input to increase and the process slowly ramps up.

It will be appreciated that for torrefied wood ideally 20 percent of the input wood energy is turned into syngas and subsequently heat and the rest of the energy comes out as biocoal. This biocoal is a brown to black product.

The problem with respect to thermal runaway is that when wood is torrefied at 250° C. to 300° C. about 40 percent of the thermal energy within the wood when torrefying wood is volatile at these temperatures and managing the process so that only 20% is evolved is an exacting control issue requiring razor sharp response time and also the ability to both add and remove heat from the process. One wants to utilize only 20 percent of the heat, because anything more would be wasted. If one cannot soak up the remaining 20 percent of the torrefaction heat generated, the process tends to want to run away. This is because the process wants everything that is volatile at 340° C. to exit the wood. This in turn makes most torrefaction processes very inefficient.

Efficiency and Thermal Runaway

It is also this inability to utilize the heat that is generated in the process which causes thermal runaway that leads to high reactor temperatures, fires and a large number of other safety concerns. Thus what is required in the torrefaction process is roasting the wood such that only 20 percent of the input heat is used to cook the wood. It will be appreciated that the increased heat over the 20 percent produces more volatiles and the process tends to run away with no safety features built in to prevent thermal runaway in the prior torrefaction processes.

Figure 7:
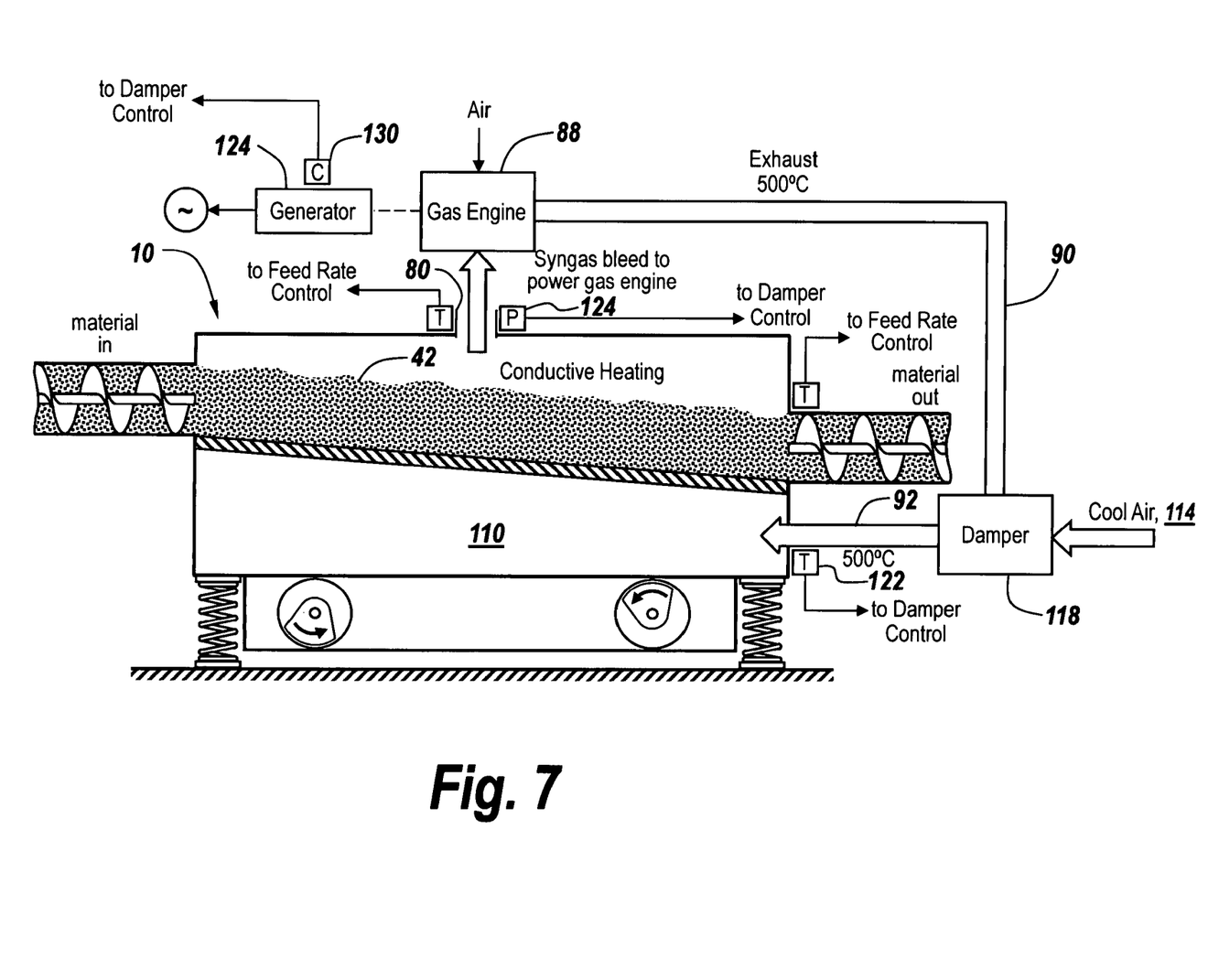
FIG. 7 is a diagrammatic illustration of the system shown in FIG. 6 which includes the utilization of a damper to inject cool air into an inert gas stream from the gas engine powered by the syngas evolving from the biomass, with the gas engine driving a generator and with the damper controlled by the pressure of the syngas at the input to the gas engine, the temperature of the hot gas delivered from the damper to the bottom plenum and by detecting removed energy in terms of the current generated by the generator, thus to provide stable control of the damper to prevent thermal runaway; and, FIG. 8 is a diagrammatic illustration of the sealing of the reactor with a solid yet undulating plate underneath which is injected 500° C. hot gas, with the syngas evolving from the torrefaction of the biomass exiting at about 300° C.

Referring now to FIG. 7, in one embodiment thermal runaway is prevented utilizing damper assembly 118 through the introduction of cold air 114 through conduit 92 into bottom plenum or chamber 110 of reactor 10. As described above the damper is controlled by the temperature at pipe 92 as sensed by thermocouple 122, by the pressure transducer 124 which measures the pressure in pipe 80 and by the current generated at current detector 130 associated with generator 124 to detect energy removed from the system.

Thus the air damper system shown in FIG. 7 is utilized to stabilize the amount of volatiles that are being generated.

It will be noted that combustion in a gas engine is relatively stable from the exhaust temperature standpoint, known for a given load although the volume of exhaust also changes making load indication a valuable control signal. Thus this design is inherently more stable than the prior designs, with the advantage of the gas engine being that the gas engines are about 40 percent thermally efficient across a wide variety of loads. In short these engines are exceptional thermal conversion machines. They are much better for instance than boiler steam power plants which are typically about 20% thermally efficient. Thus of the 40 percent volatiles syngas energy available if one takes 20 percent, or roughly half, for the roasting process and one converts the other 20 percent, the excess half, that naturally occurs into electrical energy, instead of contributing to thermal runaway this system actually produces electrical energy that removes this 20 percent heat overage, thus to stabilize the torrefaction process by pulling exactly the right amount of energy out.

One simple way to explain this is that 40 percent of the energy in the wood wants to become volatile at torrefaction temperatures and the intent is to use the entire 40 percent by bleeding off 20 percent to run an electric generator. This is in contrast to the prior torrefaction processes that are trying to operate on a knife edge to control the energies associated with the volatiles component. Thus, by taking out 20 percent of the energy associated with the volatiles one can stabilize the entire system. Note that the amount of energy taken out is adjustable in terms of the load on the generator and temperature of the reactor.

It might be thought that thermal control could be exercised simply by running a generator from the syngas fueled gas engine. The reason this is a problem is because the generator usually has a fixed maximum capacity of, for instance 560 kilowatts, and one runs the risk of actually running out of capacity in the generator. If one wants to run the generator flat out all the time one can reach the maximum capacity of the generator which in turn limits the amount of energy that can be withdrawn from the system. Thus, the maximum capacity of the generator limits the amount of energy that can be taken out. This problem is solved by the subject air damping system that permits the operators to set the maximum capacity of the generator without having to take into account the maximum capacity of the generator.

If the reactor starts producing more gas than the engine can handle one has two options. One can start putting in less wood but when wood first comes in and then leaves the reactor it takes about 30 minutes to show any change. The alternative is to inject the aforementioned cold dilution air.

In one embodiment, the aforementioned pressure transducer 124 is used as a sensing mechanism to turn on the cold air. That along with the temperature thermocouple and a current sensor on the electrical generation system completes the feedback control for the damper. Of course in the event of a massive thermal runaway which is not accommodated by the above, one can utilize a stop button which simply turns the entire wood supply process off and immediately cools the reactor with the dilution damper blower in short order.

Note that the thermocouple sensor on conduit 92 provides the primarily feedback loop to make sure that one actually has not opened the cold air damper too much. When the damper first opens it is using a current feedback loop to set for instance the temperature target at 500° C. If for instance the output gas from the generator is 600° C., in order to control the process wants to inject cool air. However one certainly does not want to go to ambient temperature. That would be too far. It is noted that the current sensor measures generator capacity such that no damping happens unless the generator is at full capacity. It is noted that if the current sensor is not at maximum, any more gas produced will just load up the engine to consume more of the gas. Once the generator has hit maximum capacity the pressure transducer reports that the system can tolerate some additional pressure to build up as a buffer in this type of system. However pressure in pipe 80 has a safety limit and again is utilized for safety purposes to make sure the pressure is not exceeded. It is noted that even when using a single pipe one does not want to operate that pipe at very high pressure because it will create a leak which will be a health and fire safety concern. One can regulate the pressure to a certain predetermined maximum utilizing the subject damper which modulates the temperature. This occurs by opening up the air which will lower the exhaust temperature a little bit and will keep the reactor from producing more syngas, with these two operating back and forth to naturally moderate the system.

It is noted that the cool air damper system works because the gas from the engine is non-volatile and one can simply cool it or not with direct dilution, as opposed to a heat exchanger, and nothing untoward happens. However one cannot mix cold air with syngas as it would combust or potentially explode.

In summary, syngas is generated from the reactor and is used to produce heat to roast the wood in a torrefaction process. The process in one embodiment uses a gas engine to extract energy as both electricity and heat from the syngas.

It is noted that one can also remove heat either using a boiler to make steam or one can simply combust the syngas in an oxidizer. The problem with the oxidizer is that it simply produces far more heat than the process needs. Note that the use of an oxidizer is generally counter-indicated because it is a low pressure device and operates on ambient combustion with the required duct work being on the order of 24 to 30 inches diameter. On the other hand a gas engine is essentially an air pump and one can combust gas at fairly substantial pressures both on the intake side and the compressed out exhaust side. This means that one can utilize 12-18 inch exhaust pipes which are much smaller.

Figure 8:
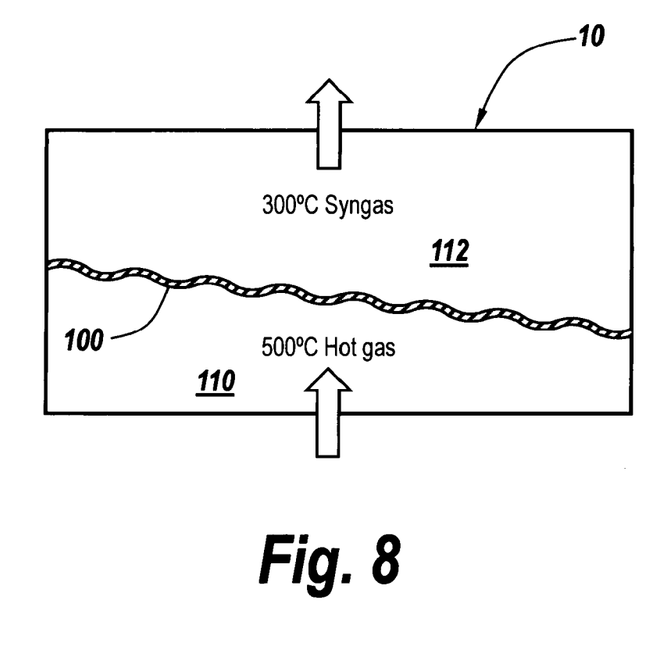

Referring now to FIG. 8, what is shown is a waffle type solid separator in reactor 10 which separates the reactor into a lower plenum or chamber 110 and upper plenum or chamber 112. This plate provides conductive heating which takes the 500° C. hot gas which is injected beneath the plate and roasts the biomass on top of the plate until it drives out all of the volatiles such that 300° C. syngas evolves.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for modifying a vibratory dryer to provide a vibrating torrefaction reactor comprising the steps of:
   in a vibrating dryer having a multiplicity of conduits from the inside of the dryer to the outside of the dryer, sealing off all but a small predetermined number of conduits,
   providing the dryer with an unperforated solid plate from one side of the dryer to the other for supporting a biomass to be torrefied on top of the plate, the solid plate being inclined, non-planar and having a plurality of waffle-shaped ridges thereby providing more surface area to transfer energy while not impeding the conveyance of biomass; and,
   introducing a hot gas underneath the unperforated solid plate, conductively transferring heat through the plate from the hot gas to the biomass, whereby convective heating roasts the biomass in a torrefaction process.

2. The method of claim 1, and further including an exit conduit for removal of syngas from the reactor.

3. The method of claim 2, and further including duct work coupled to the exit conduit and a flexible heat resistant gland between the exit conduit and associated duct work, whereby the vibratory motion of the reactor against the duct work is accommodated by the gland, such that the reactor has only one syngas port at which leakage can occur.

4. The method of claim 2, further comprising ducting the syngas directly to a gas engine for immediate combustion and introducing an exhaust from the gas engine beneath the plate to provide the hot gas, wherein the hot gas is non-volatile, thereby eliminating the exposure of syngas or other volatile gas to the reactor.

5. The method of claim 4 and further including mechanically coupling an electrical generator to the gas engine for the production of electricity thereby increasing the efficiency of a torrefaction reactor such that the overall energy efficiency of the torrefaction process exceeds 80%.

6. The method of claim 1 further comprising:
   injecting cold air along with the hot gas into the reactor to regulate the temperature of the reactor, wherein the plate extends from one end of the reactor to the other to form a bottom plenum, wherein the plate is impermeable, the solid plate preventing syngas that evolves in the torrefaction process from being exposed to oxygen.

7. The method of claim 6, wherein the reactor includes a gas engine and wherein the hot gas is from an exhaust of the gas engine.

8. The method of claim 7, wherein and further including an electric generator coupled to the gas engine with the electrical generator provided with a current sensor, wherein the conduit that channels the syngas to the gas engine includes a pressure transducer and wherein the injection of the hot gas into the reactor includes an inlet conduit having an thermocouple sensor and further including a damper assembly for the injection of the cold air controlled by the output of the current sensor, the pressure transducer and the thermocouple sensor.

9. The method of claim 8, wherein the syngas evolving from the reactor is cooled before being used as a fuel for the gas engine.

10. The method of claim 9, wherein as a result of the cooling of the syngas, tar is removed.

11. The method of claim 1 further comprising the steps of:
    blocking off all exit ports of the dryer with the exception of an exit port utilized to bleed off syngas in the torrefaction process: and,
    providing a flexible gasketed conduit for the syngas from the torrefaction process, whereby the number of conduits that need to be gasketed is reduced over the original number of conduits.

12. A method for torrefying a biomass, comprising the steps of
    providing a reactor that is fabricated with a solid plate wherein the solid plate is non-planar and unperforated, thereby providing more surface area to transfer energy;
    introducing the biomass onto the solid plate;
    heating the solid plate from underneath with hot inert gas such that heat from the hot inert gas is conductively transferred to the biomass through the heating of the solid plate, generating a syngas by-product.

13. The method of claim 12, and further including a gas engine and a conduit for the evolving syngas coupled between the reactor and the gas engine.

14. The method of claim 13, and further including using the exhaust from the gas engine to heat the solid plate, thereby providing a heat exchanger.

15. A method for modifying a vibratory dryer to provide a vibrating torrefaction reactor comprising the steps of:
    sealing off all but a small predetermined number of conduits in a vibrating dryer having a multiplicity of conduits from the inside of the dryer to the outside of the dryer,
    providing the dryer with an unperforated solid plate from one side of the dryer to the other for supporting a biomass to be torrefied on top of the plate, the unperforated solid plate being inclined, non-planar and having a plurality of waffle-shaped ridges thereby providing more surface area to transfer energy while not impeding the conveyance of biomass;
    introducing a hot gas underneath the unperforated solid plate, conductively transferring heat through the plate from the hot gas to the biomass, whereby convective heating roasts the biomass in a torrefaction process;
    maintaining one of the conduits from the multiplicity of conduits as an exit conduit for removal of syngas from the reactor;
    ducting the syngas directly to a gas engine for immediate combustion;
    introducing an exhaust from the gas engine beneath the plate to provide the hot gas, wherein the hot gas is non-volatile, thereby eliminating the exposure of syngas or other volatile gas to the reactor.

16. The method of claim 15, wherein the waffle-shaped ridges further comprise a plurality of protuberances for a conductive transfer of heat from non-volatile flue gas in the bottom plenum to the top plenum which contains biomass and volatile syngas.

* * * * *